US009093227B2

(12) United States Patent
Teng et al.

(10) Patent No.: US 9,093,227 B2
(45) Date of Patent: Jul. 28, 2015

(54) SUPER CAPACITOR WITH GEL ELECTROLYTE OF POLY(ETHYLENE GLYCOL) BLENDING POLY(ACRYLONITRILE) AND MANUFACTURING METHOD THEREOF

(71) Applicant: National Cheng Kung University, Tainan (TW)

(72) Inventors: Hsisheng Teng, Tainan (TW); Sheng-Shu Hou, Tainan (TW); Ping-Lin Kuo, Tainan (TW); Cheng-Wei Huang, Tainan (TW); Ching-An Wu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 154 days.

(21) Appl. No.: 13/656,428

(22) Filed: Oct. 19, 2012

(65) Prior Publication Data

US 2013/0100584 A1    Apr. 25, 2013

(30) Foreign Application Priority Data

Oct. 19, 2011 (TW) .............................. 100137990 A
Sep. 24, 2012 (TW) .............................. 101134847 A (51) Int. Cl.
*H01G 11/56* (2013.01)
*H01G 11/70* (2013.01)
*H01G 9/025* (2006.01)
*H01G 9/022* (2006.01)

(52) U.S. Cl.
CPC .............. *H01G 11/56* (2013.01); *H01G 11/70* (2013.01); *H01G 9/022* (2013.01); *H01G 9/025* (2013.01); *Y02E 60/13* (2013.01); *Y10T 29/417* (2015.01)

(58) Field of Classification Search
CPC ....... H01G 11/56; H01G 9/038; H01G 11/64; H01G 11/60; H01G 11/62; H01G 11/50; H01G 11/58; H01G 9/022; H01G 9/025; H01G 9/035; H01G 9/058; H01G 9/155; H01G 11/06; H01G 11/02; H01G 11/54; H01G 9/2004
USPC .......................................... 361/502, 504, 506
See application file for complete search history.

(56) References Cited

U.S. PATENT DOCUMENTS

2010/0040954 A1* 2/2010 Amine et al. ................. 429/322
2012/0021280 A1* 1/2012 Katase et al. ................. 429/211
2012/0077095 A1* 3/2012 Roumi et al. ................. 429/405

FOREIGN PATENT DOCUMENTS

TW    200623489    7/2006
TW    200837756    9/2008

OTHER PUBLICATIONS

Taiwanese Office Action issued in Taiwanese Application No. 101134847.
Huang et al., "Gel Electrolyte Derived from Poly(ethylene glycol)Blending Poly(acrylonitrile) Applicable to Roll-to-Roll Assembly of Electric Double Layer Capacitors," Advanced Functional Materials (2012) pp. 1-9.

* cited by examiner

*Primary Examiner* — Dion R Ferguson (57) ABSTRACT

Super capacitor including a gel electrolyte and manufacturing method thereof are provided. The gel electrolyte is one selected from a group consisting of a P(AN-EG-AN) copolymer, a P(AN-EG) copolymer, a P(EG-AN-EG) copolymer and a combination thereof.

12 Claims, 9 Drawing Sheets

SUPER CAPACITOR WITH GEL ELECTROLYTE OF POLY(ETHYLENE GLYCOL) BLENDING POLY(ACRYLONITRILE) AND MANUFACTURING METHOD THEREOF

CROSS-REFERENCES TO RELATED APPLICATIONS

The application claims the benefits of Taiwan Patent Application Numbers 100137990 and 101134847, respectively filed on Oct. 19, 2011 and Sep. 24, 2012, in the Taiwan Intellectual Property Office, the disclosures of which are incorporated herein in their entirety by reference.

FIELD OF THE INVENTION

The present invention relates to a super capacitor including a gel electrolyte and manufacturing method thereof. In particular, the gel electrolyte relates to the gel electrolyte of P(AN-EG-AN) copolymer having high conductivity for a super capacitor.

BACKGROUND OF THE INVENTION

Figure 1A:
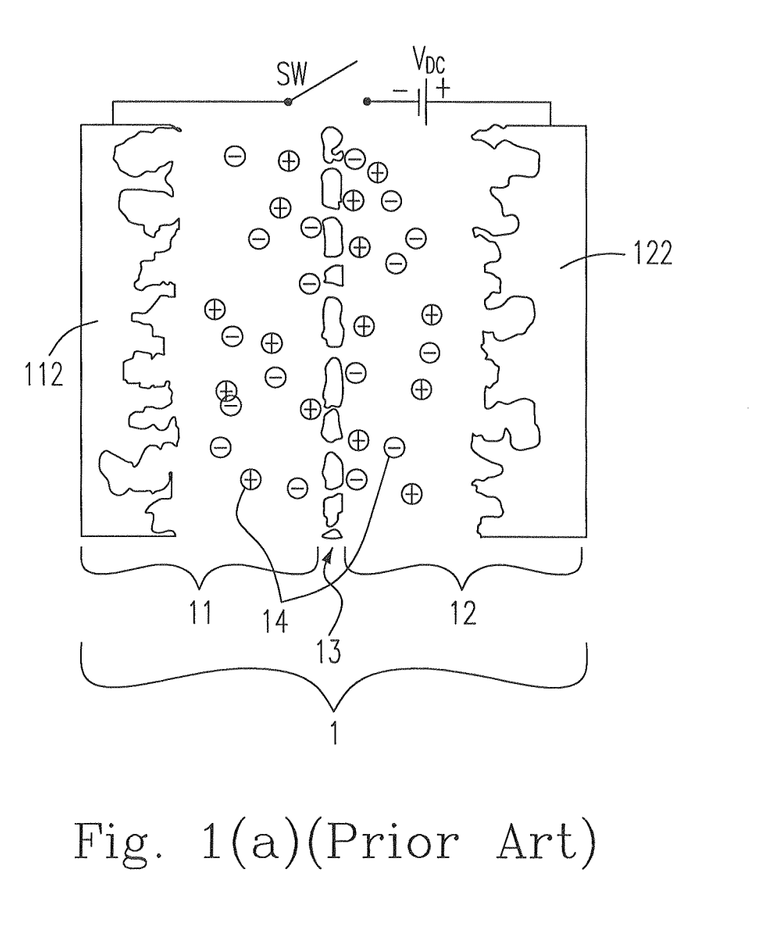
FIG. 1(a) shows a schematic circuit diagram of a conventional super capacitor using aqueous electrolyte.
Figure 1B:
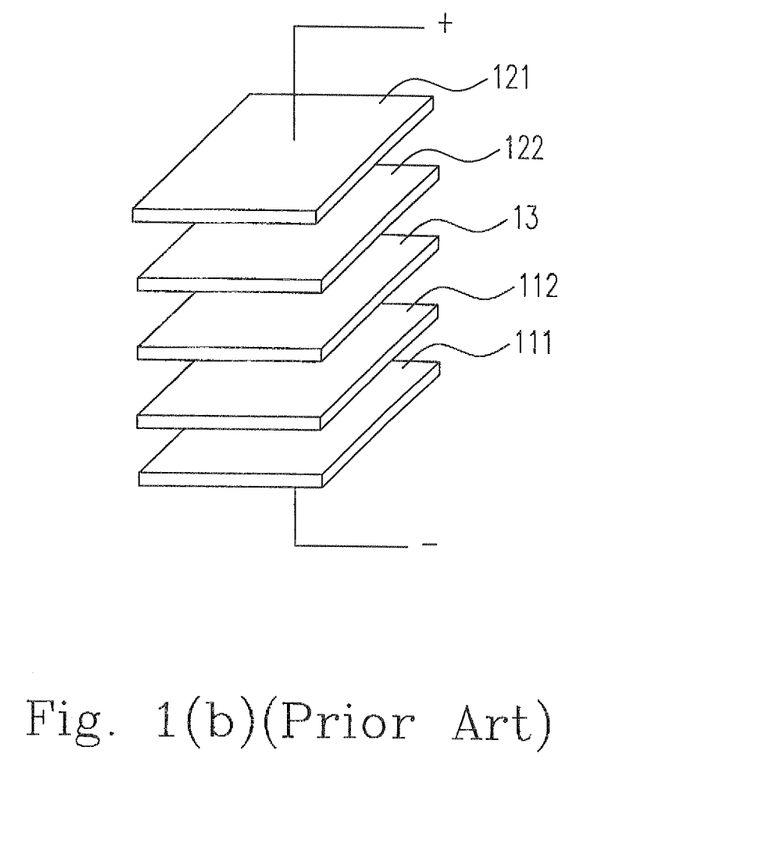
FIG. 1(b) shows another schematic circuit diagram of the conventional super capacitor using aqueous electrolyte.

Super capacitors use aqueous or organic electrolytes. The organic electrolyte system has wider potential window than that of an aqueous electrolyte system. A schematic circuit diagram of a conventional super capacitor using aqueous electrolyte (e.g. an electric double layer capacitor, EDLC) is shown in FIG. 1(a). In FIG. 1(a), the super capacitor is electrically connected to a switch SW and a DC power source $V_{DC}$, and comprises a first capacitor 11, a second capacitor 12, a separator 13 and an aqueous electrolyte 14. The first capacitor 11 includes a current collector 111 (not shown, see FIG. 1(b)) and a carbon material 112, and the second capacitor 12 includes a current collector 121 (not shown, see FIG. 1(b)) and a carbon material 122. FIG. 1(b) shows another schematic circuit diagram of the conventional super capacitor using aqueous electrolyte. As shown in FIG. 1(b), the super capacitor 1 includes the current collector 111, the carbon material 112, the separator 13, the current collector 121 and the carbon material 122. But, the degeneration and the liquid leakage of the organic-phase electrolyte are easily happened. Thus, solid electrolyte and gel electrolyte are developed to solve the above-mentioned problems. The PEO-based electrolytes commonly exhibit conductivities which range from $10^{-4}$ to $10^{-8}$ and from $10^{-4}$ to $10^{-3}$ S cm$^{-1}$ for solid polymer electrolytes and gel electrolytes, respectively, which are not sufficient to exceed those of the organic electrolytes.

Thus, for increasing the applicability and the conductivity of the gel electrolyte, how to cause the gel electrolyte to include the characteristics of having higher conductivity (e.g., >$10^{-2}$ S cm$^{-1}$), lower impedance, higher energy density, higher power density and wider working potential window so as to manufacture this gel copolymer into a thin-film electrolyte to fit in with the usage of a super capacitor is really a problem urgently await to be solved in this field.

Keeping the drawbacks of the prior arts in mind, and employing experiments and research full-heartily and persistently, the applicant finally conceived a super capacitor with gel electrolyte of poly(ethylene glycol) blending poly(acrylonitrile) and manufacturing method thereof.

SUMMARY OF THE INVENTION

It is a primary objective of the present invention to provide a super capacitor including a gel electrolyte and manufacturing method thereof. The gel electrolyte having a high conductivity copolymer of P(AN-EG-AN) includes the characteristics of having higher conductivity (e.g., >$10^{-2}$ S cm$^{-1}$), lower impedance, higher energy density, higher power density and wider working potential window, this gel copolymer is manufactured into a thin-film electrolyte applicable to a super capacitor.

According to the first aspect of the present invention, a super capacitor comprises a gel electrolyte being one selected from a group consisting of a P(AN-EG-AN) copolymer, a P(AN-EG) copolymer, a P(EG-AN-EG) copolymer and a combination thereof.

According to the second aspect of the present invention, a charge storage device comprises a gel electrolyte being one selected from a group consisting of a P(AN-EG-AN) copolymer, a P(AN-EG) copolymer, a P(EG-AN-EG) copolymer and a combination thereof.

According to the third aspect of the present invention, a manufacturing method for a charge storage device comprises the steps of: providing a gel electrolyte layer, a first electrode material layer and a second electrode material layer; wetting the first and the second electrode material layers with one of an organic solvent and an electrolyte; and pressing the wetted first electrode material layer, the gel electrolyte layer, and the wetted second electrode material layer to manufacture the charge storage device, wherein the gel electrolyte layer is configured between the wetted first electrode material layer and the wetted second electrode material layer.

The present invention can be best understood through the following descriptions with reference to the accompanying drawings, in which:

DETAILED DESCRIPTION OF THE PREFERRED EMBODIMENT

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

For increasing the applicability and the conductivity of the gel electrolyte, the present invention designs a high conductivity copolymer comprising a poly(ethylene glycol) (PEG) and a poly(acrylonitrile) (PAN), e.g., being one selected from a group consisting of a P(AN-EG-AN) copolymer, a P(AN-EG) copolymer, a P(EG-AN-EG) copolymer and a combination thereof, in accordance with the requirements of a super capacitor, e.g. an EDLC or an electrochemical capacitor.

Among them, e.g., a thin-film formed by the P(AN-EG-AN) copolymer possesses the features of having higher light permeability, higher thermal stability, higher electrochemical stability and better mechanical strength, and includes the characteristics of having higher conductivity (e.g., $>10^{-2}$ S $cm^{-1}$), lower impedance, higher energy density, higher power density and wider working potential window when it is mixed with a lithium salt, e.g. a lithium perchlorate ($LiClO_4$), and a plasticizer having an acidamide, e.g. a dimethylformamide (DMF), so as to manufacture this gel copolymer into a thin-film electrolyte especially suitable for the applications of a super capacitor. The structure design of the P(AN-EG-AN) employs ethylene oxide(EO) segment having the characteristics of including positive ion with high conductivity as a main body of positive ion conductivity and together with the PAN segment having higher pliability to supplement the insufficiency of the mechanical strength therein when only the PEG is used. Besides, the CN functional group on the PAN can also assist the positive ion transmission further to cause the whole macromolecular chain of P(AN-EG-AN) to be able to transmit the positive ion.

Figure 2A:
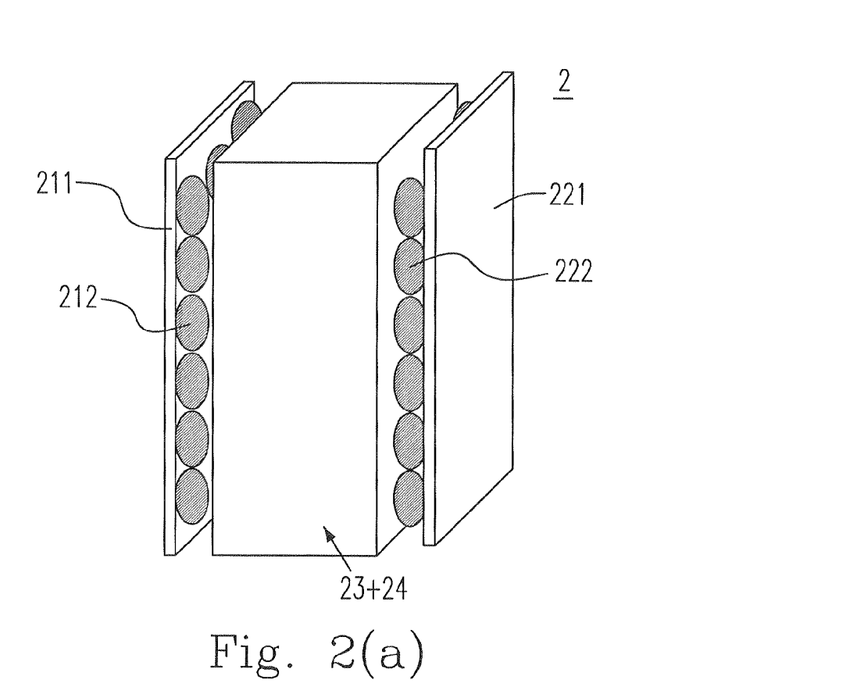
FIG. 2(a) shows a schematic diagram of a super capacitor using a gel electrolyte before it is formed by the pressing according to the preferred embodiment of the present invention.
Figure 2B:
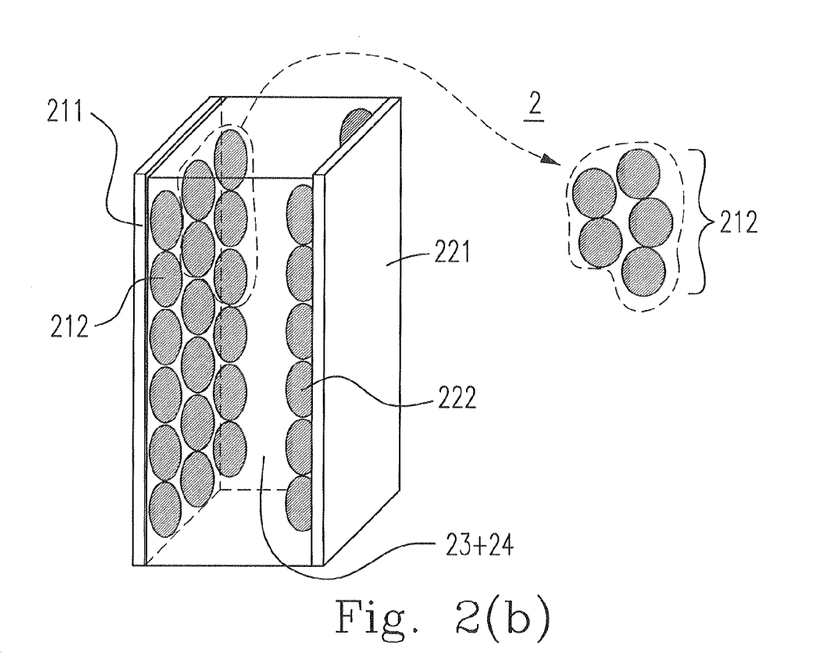
FIG. 2(b) shows a schematic diagram of the super capacitor formed after the pressing according to the preferred embodiment of the present invention.

Using the copolymer P(AN-EG-AN) of PAN and PEG as a gel electrolyte (mixed with a lithium salt, e.g. a lithium perchlorate ($LiClO_4$), and a plasticizer having an acidamide, e.g. a dimethylformamide (DMF)), and using the active carbon fibers as electrodes, to assemble a bipolar capacitor, e.g. a super capacitor (it is an EDLC, or a pseudo-capacitor), this is formed by a pressing process. This gel electrolyte has a low mechanical strength, and the electrolyte can get in and out the electrode material by the pressing. The functions of the gel electrolyte are to provide the electrolyte and the separator. FIG. 2(a) shows a schematic diagram of a super capacitor using a gel electrolyte, e.g. an EDLC, before it is formed by the pressing according to the preferred embodiment of the present invention. In FIG. 2(a), the super capacitor 2, before formed by pressing, includes the current collector 211, the activated carbon with plural electrode particles 212 (e.g. an active carbon fiber), a current collector 221, the activated carbon with plural electrode particles 222 and a copolymer P(AN-EG-AN) (mixed with a lithium salt, e.g. a lithium perchlorate, and a plasticizer, e.g. a dimethylformamide (DMF)) 23+24 forming a separator 23 and a gel electrolyte 24 after the pressing. FIG. 2(b) shows a schematic diagram of the super capacitor formed after the pressing according to the preferred embodiment of the present invention. In FIG. 2(b), the super capacitor 2 includes the current collector 211, the activated carbon with plural electrode particles 212, the current collector 221, the activated carbon with plural electrode particles 222 and the separator 23 formed in the middle part of the gel electrolyte 23+24 after the pressing.

To understand the differences and capabilities between the gel electrolyte (GE) manufactured by P(AN-EG-AN) and the liquid electrolyte (LE) in the prior art, a comparison via electrochemical tests is engaged as follows.

Figure 3A:
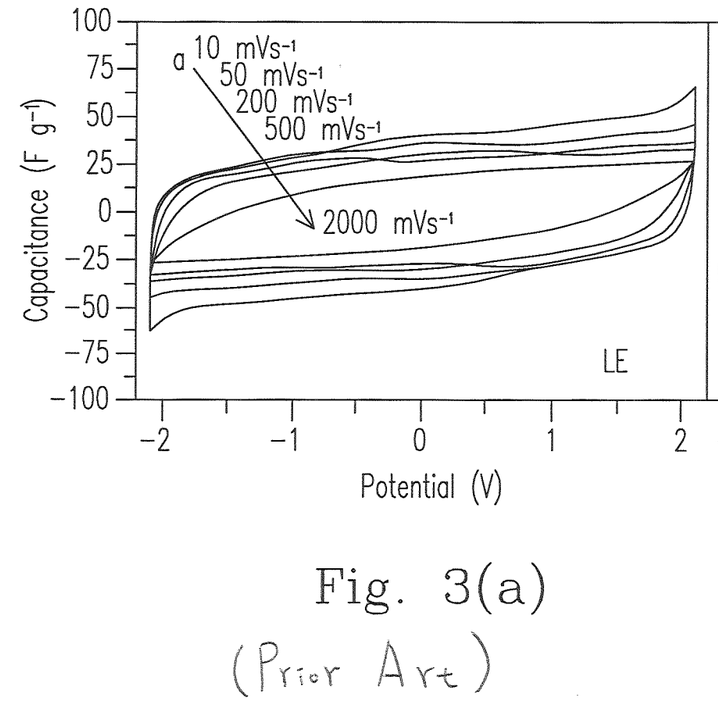
FIG. 3(a) and FIG. 3(b) respectively show the capacitance curves of the capacitance value versus the potential value according to the cyclic voltammetry under various states of low speed to high speed of a liquid electrolyte in the prior art and a gel electrolyte according to the present invention.
Figure 3B:
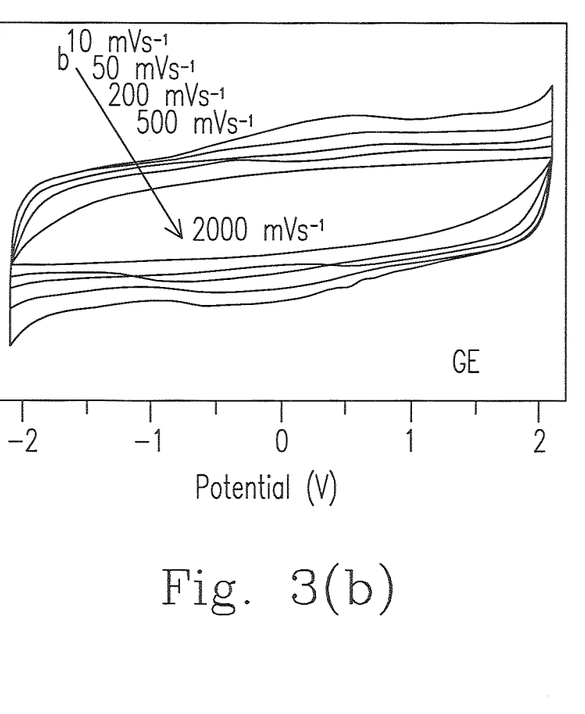

FIG. 3(a) and FIG. 3(b) respectively show the capacitance curves of the capacitance value versus the potential value according to the cyclic voltammetry under various states of low speed ($10\,mVs^{-1}$) to high speed ($2000\,mVs^{-1}$) of a liquid electrolyte (LE) in the prior art and a gel electrolyte (GE) according to the present invention. As shown in FIG. 3(a) and FIG. 3(b), the organic electrolyte (LE) and the gel electrolyte (GE) both have good capacitance storage capability. In FIG. 3(a) and FIG. 3(b), the capacitance curves are still maintained quite well with a little bit of deflection until the high speed of $500\,mVs^{-1}$, and the gel electrolyte (GE) shows a better capacitance storage capability than that of the organic electrolyte (LE).

Figure 4:
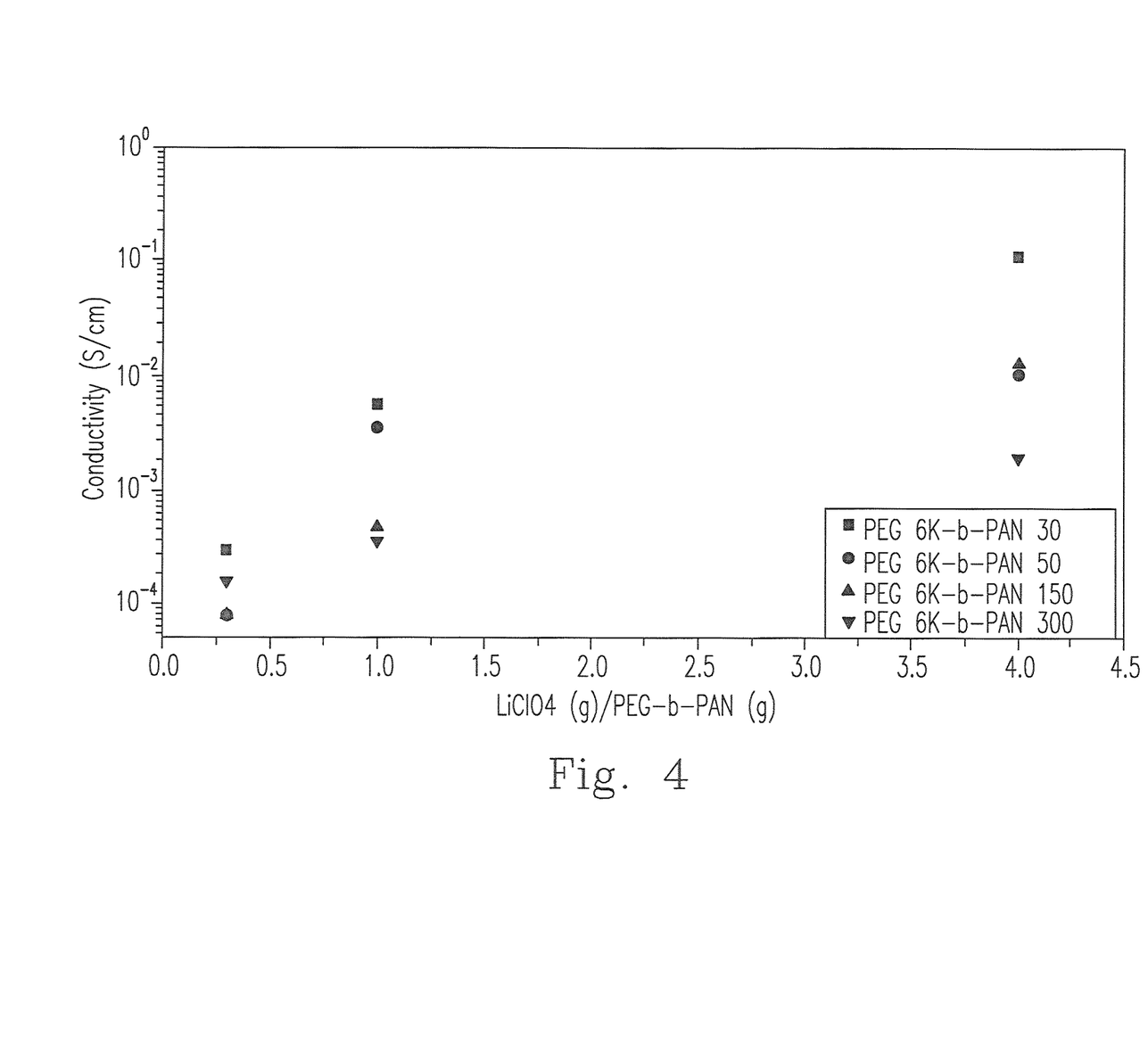
FIG. 4 shows a schematic diagram of conductivity versus LiClO$_4$ (g)/PEG-b-PAN (g) of polymers of PEG 6K series.

FIG. 4 shows a schematic diagram of conductivity versus LiClO4 (g)/PEG-b-PAN (g) of polymers of PEG 6K series. Observed from this diagram, among the polymers of the PEG 6K series, there is a relatively higher conductivity when $LiClO_4$ (g)/polymer (g)=4, wherein there is a relatively highest conductivity value at PEG 6k-b-PAN 30, where 30 represents the reaction mole ratio of AN versus PEG is 30 times. According to other experiment data of the present invention (not shown), the copolymers of the PEG 6k series, have relatively higher conductivity values than other copolymer series, which is presumably because of the capability of Lithium ion transmission is lower when the EO segment is shorter (e.g. PEG 1K series), and the capability of Lithium ion transmission is lower when the EO segment is longer (e.g. PEG 10K series) due to the re-crystallization of the PEG segment.

Figure 5:
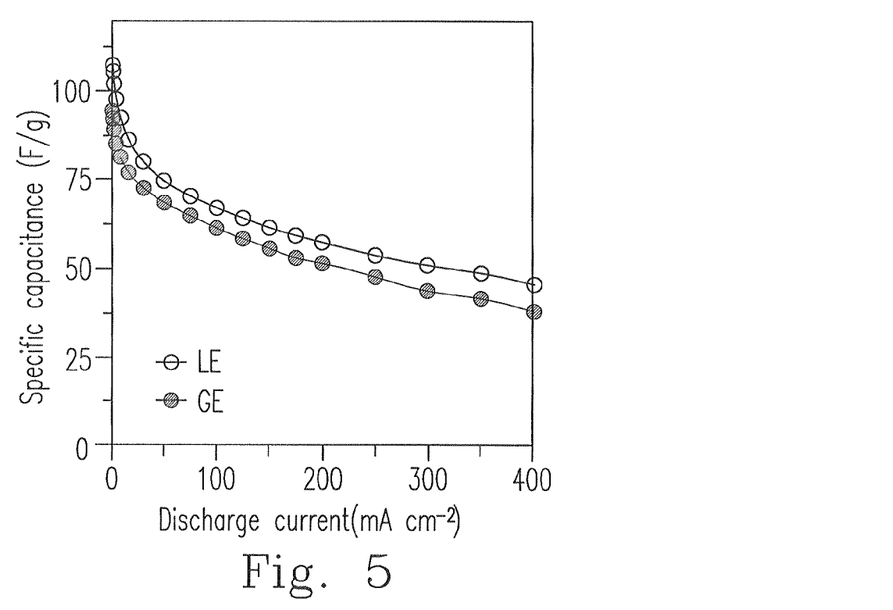
FIG. 5 shows the curve diagram of specific capacitance versus discharge current of the organic electrolyte (LE) and the gel electrolyte (GE)

FIG. 5 shows the curve diagram of specific capacitance versus discharge current of the organic electrolyte (LE) and the gel electrolyte (GE). In FIG. 5, the concentration of the organic electrolyte (LE) is 1 mole $LiClO_4$ in DMF, each of the carbon electrode has an area of 1 $cm^2$, and each of the capacitors has been charged at 1 mA to 2.1 V prior to discharge. In the charge-discharge tests, the capacity is decreased following the increase of the discharge current due to the resistance formed by the electrolyte ions transmission, or the electron transmission inside the electrode. The liquid-phase organic electrolyte (LE) and the gel electrolyte (GE) used under the high discharge speed, can apparently maintain the performance of high capacity, but the capacitor of using the gel electrolyte performs better than that of using the liquid-phase organic electrolyte. In FIG. 5, in the capacitance tests of GE and LE, the respective capacities of GE and LE obtained at the low current speed are corresponsive, and the respective capacities of GE obtained at the high current speed are higher than those of the LE, which is because of the differences of the inner resistances of the capacitors. And, the inner resistance mainly includes the electrolyte resistance, the contact resistance of the electrode and the electrolyte, and the resistance generated due to the ion movements in the holes of carbon.

Figure 6:
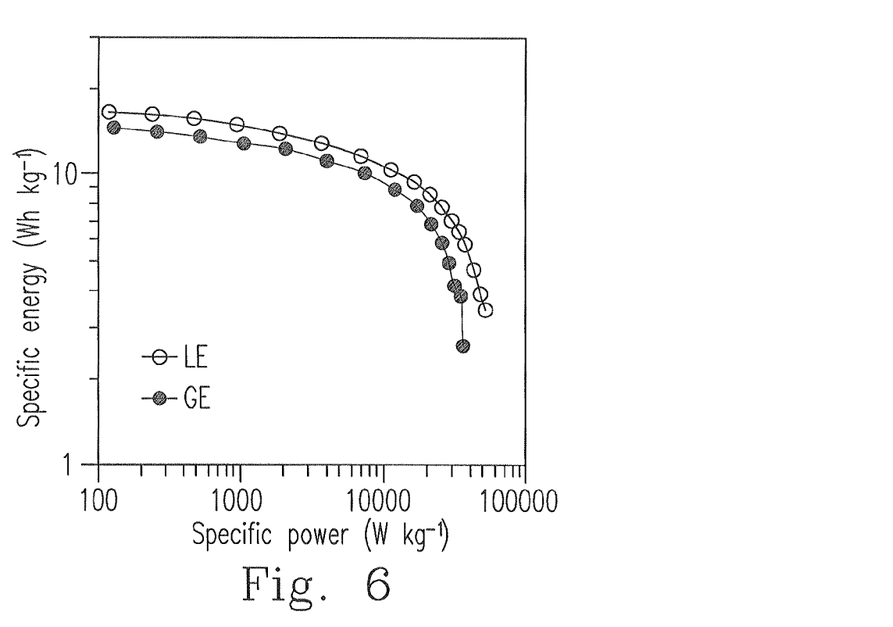
FIG. 6 shows the curve diagram of specific energy versus specific power of the organic electrolyte and the gel electrolyte.

FIG. 6 shows the curve diagram of specific energy versus specific power of organic electrolyte (LE) and the gel electrolyte (GE). In FIG. 6, the energy density of the capacitor including the gel electrolyte is larger than that of the capacitor including liquid-phase electrolyte (LE). For example, under high power ($10000\,Wkg^{-1}$), the energy density (10.8 Wh $kg^{-1}$) of the capacitor including the gel electrolyte is apparently larger than that of the capacitor including liquid-phase electrolyte (LE).

Figure 7:
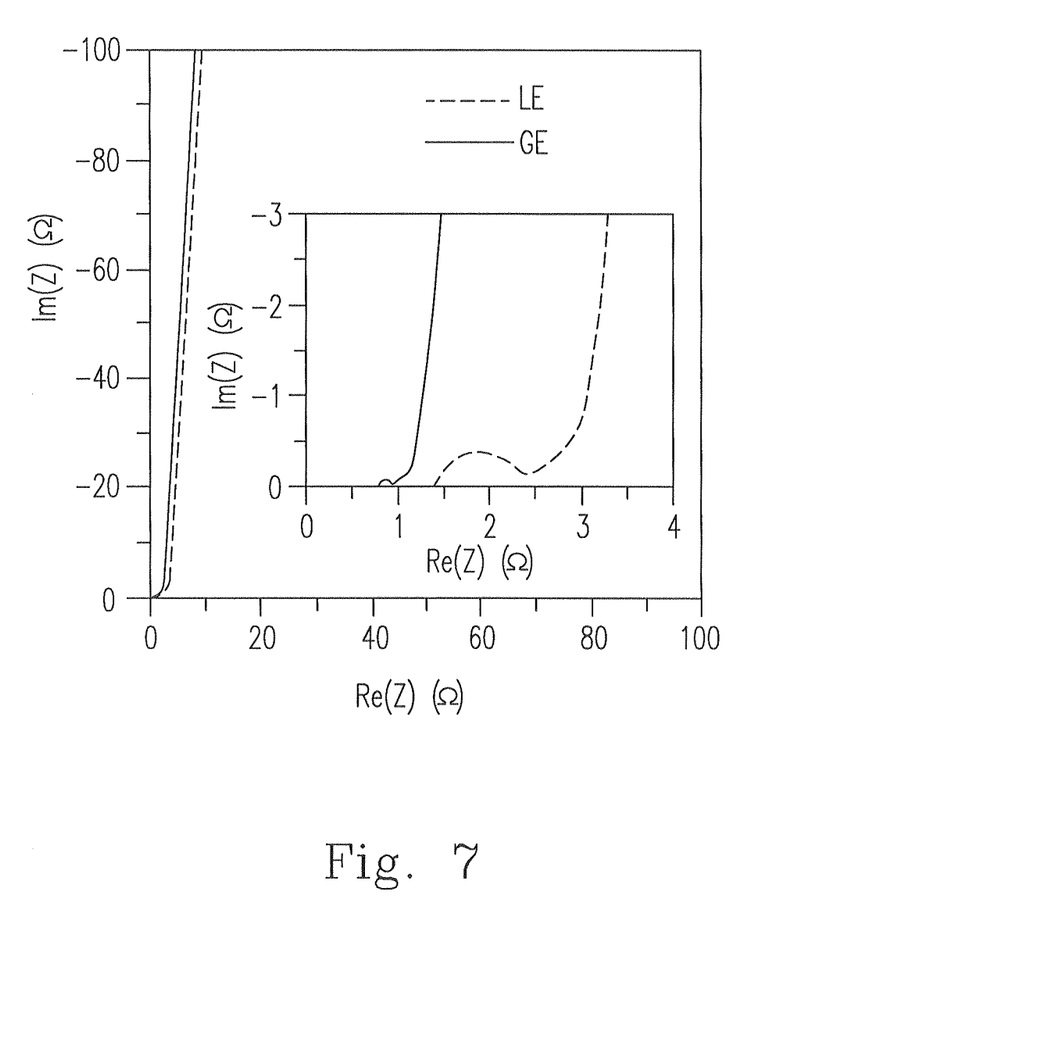
FIG. 7 shows the Nyquist impedance plots for organic electrolyte and gel electrolyte.

To analyze the composition of the resistance of the super capacitor, it is analyzed via the AC impedance as follows. FIG. 7 shows the Nyquist impedance plots for organic electrolyte (LE) and gel electrolyte (GE), wherein the real number portion of the impedance is shown by the horizon axle and the imaginary number portion of the impedance is shown by the vertical axle with frequency ranging from 10 mHz to 100 kHz at an applied potential of 0 V. The high frequency region data is shown in the inset. Referring to FIG. 7, using GE and LE as the electrolytes of the capacitors, both of which have good capacitance behaviors, but the capacitor including the gel electrolyte (GE) has the lower resistance. For example, the resistance under the frequency of 1 kHz: GE is 0.94Ω, and LE is 0.37Ω. To analyze the composition of the resistance, the measurement of the impedance in the high frequency region is observed. In the inset of FIG. 7, the initial point of the GE curve ($R_i$) is smaller than that of the LE curve, which indicates the difference between the resistances of electrolytes. The ion transmission of GE is higher than that of the LE due to that GE has the PEG and the Pan macromolecular chains, PEO has the oxygen functional group providing the lithium ion to jump on the bond, PAN is also helpful to the transmission of the electrolyte, the resolution of the P(AN-EG) copolymer is higher than that of the liquid-phase, and thus the $R_i$ of GE is smaller than that of LE. The semicircle therein indicates the circumstances that the electrode of the capacitor is contacting with the interface of the electrolyte. The semicircle of the GE is larger than that of the LE which is caused by the contact resistance ($R_c$) of carbon material. There is an apparent difference between GE and LE, that is a transitional segment between the ending point of the semicircle and the raising line, and this segment is the equivalent distributed resistance (EDR) among the carbon particles. Using the GE as the electrolyte, its EDR is apparently lower, this difference is due to that the GE can penetrate deeply into the electrode particles so as to get a lower EDR value, and the resistance of the ion transmission in the holes of the carbon of the GE is also smaller, which is also influenced by the difference of ion concentrations outside the carbon particles. The related resistance values of LE and GE are listed in Table 1, wherein $R_p$ is the resistance of the carbon material, and $R_t$ is the total resistance of the capacitor.

TABLE 1

The related resistance values of LE and GE

| Sample | $R_i$ | $R_c$ | EDR/Ω | $R_p$/Ω | $R_t$/Ω |
|---|---|---|---|---|---|
| LE | 2.80 | 0.57 | 0.67 | 4.04 | 8.07 |
| GE | 0.92 | 0.92 | 0.10 | 2.59 | 4.52 |

Figure 8:
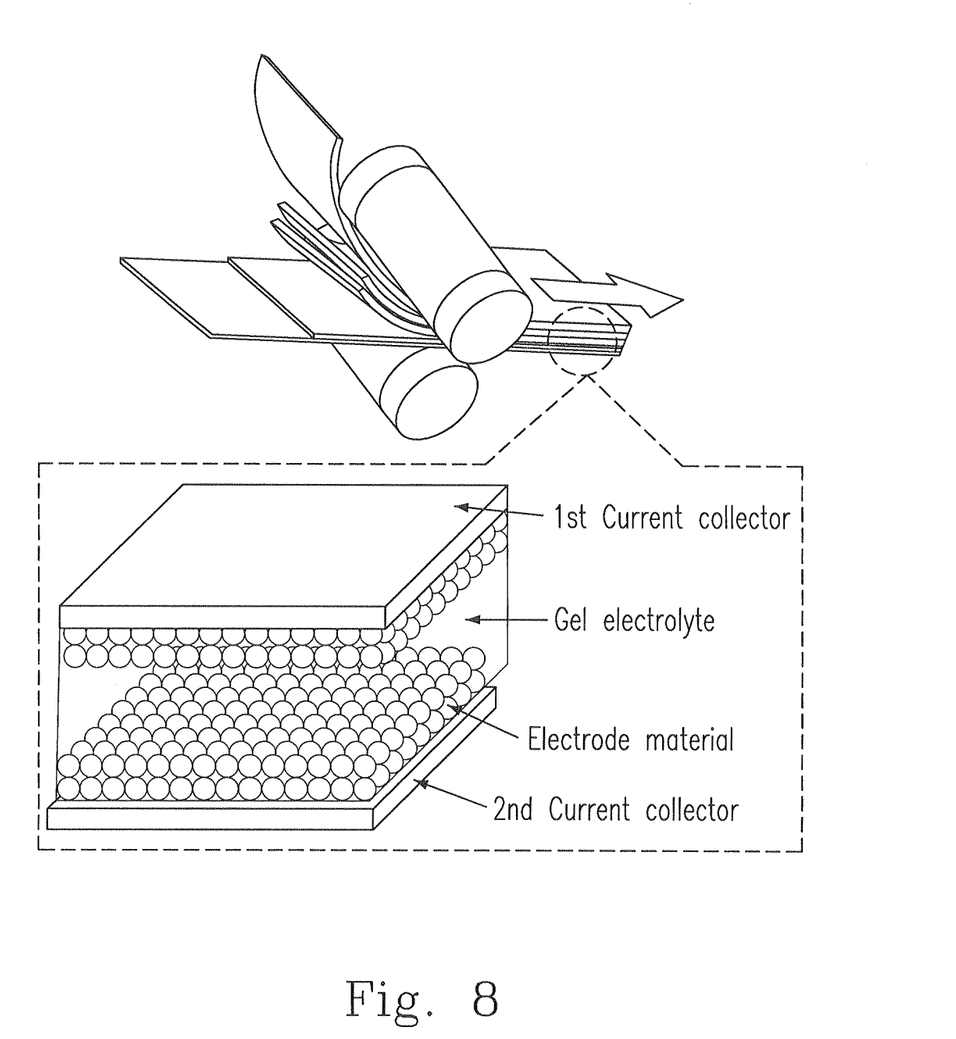
FIG. 8 depicts the construction of an electric double layer capacitor (EDLC) cell assembled with gelled polymer electrolyte.

FIG. 8 depicts the construction of an EDLC cell assembled with gelled polymer electrolyte (GPE). The cell consists of two facing identical carbon electrodes sandwiching a GPE film. The carbon electrodes were wetted with a lithium salt/DMF electrolyte solution before cell assembly. When the GPE film came in contact with the wetted carbon films under pressure, the boarders of the film became viscous and lost their mechanical integrity due to DMF plasticization. This resulted in the diffusion of the polymer into the carbon film, converting the liquid electrolyte to a gel. This process provided close contact for the carbon/GPE interface.

The inset of FIG. 8 shows a schematic diagram of the carbon/GPE/carbon sandwich-type cell. While the boarder regions of the GPE film are viscous and well in contact with the carbon particles, the center zone of the GPE film maintains its mechanical integrity and firmly partitions the cell as a separator. FIG. 8 demonstrates the feasibility of roll-to-roll assembly of EDLCs using the proposed gel-state GPE.

Figure 9:
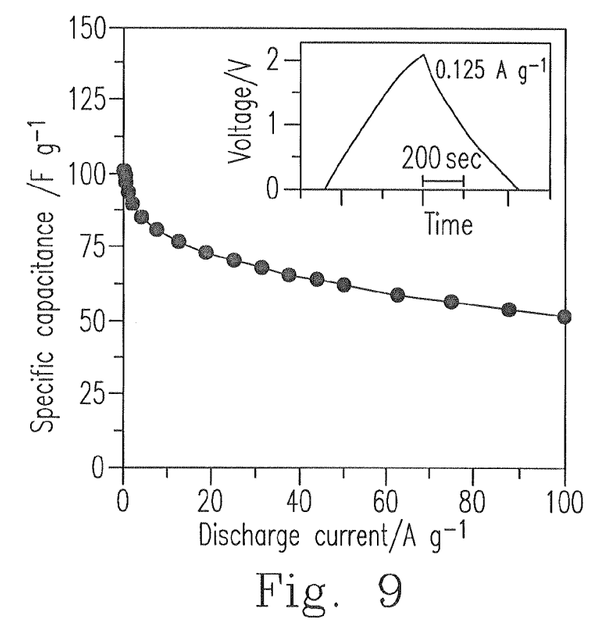
FIG. 9 shows curve diagram of the specific capacitance values versus varying specific discharge currents.

FIG. 9 shows the specific capacitance values at varying specific discharge currents. The specific capacitance values obtained at the lowest discharge current (0.125 A $g^{-1}$) are similar, 101 F $g^{-1}$ for the GPE-EDLC electrodes, respectively. The inset of FIG. 9 shows the potential versus time curves of both cells charged and discharged at 0.125 A $g^{-1}$, exhibiting standard capacitive behavior of double layer capacitors.

Figure 10:
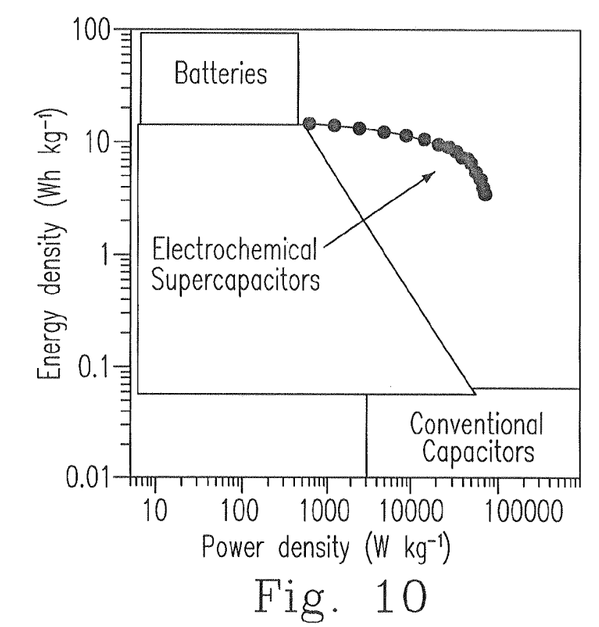
FIG. 10 shows curve diagram of the specific energy versus power density of EDLC with gelled polymer electrolyte.

FIG. 10 shows the specific energy and power density results of GPE-EDLC. The performance of the GPE-EDLC cell can be seen in a Ragone plot where power and energy densities are located over the region of electrical super capacitors. The present results are positioned at the upper right corner of the Ragone plot, showing superior performance.

Embodiments:

1. A super capacitor comprising a gel electrolyte being one selected from a group consisting of a P(AN-EG-AN) copolymer, a P(AN-EG) copolymer, a P(EG-AN-EG) copolymer and a combination thereof.

2. A super capacitor according to Embodiment 1 being one of a pseudo-capacitor and an electric double layer capacitor.

3. A super capacitor according to Embodiment 1 or 2, wherein the gel electrolyte further comprises a lithium salt and a plasticizer having an acidamide.

4. A super capacitor according to anyone of the above-mentioned Embodiments, wherein the lithium salt is a lithium perchlorate, and the plasticizer having the acidamide is a dimethylformamide (DMF).

5. A super capacitor according to anyone of the above-mentioned Embodiments further comprising an electrode, wherein the electrode is an activated carbon.

6. A super capacitor according to anyone of the above-mentioned Embodiments, wherein the activated carbon is one selected from a group consisting of an active carbon fiber, a porous carbon material, a high electrical conductivity carbon material, and a combination thereof.

7. A charge storage device, comprising a gel electrolyte being one selected from a group consisting of a P(AN-EG-AN) copolymer, a P(AN-EG) copolymer, a P(EG-AN-EG) copolymer and a combination thereof.

8. A device according to Embodiment 7 being a super capacitor, wherein the super capacitor is one of a pseudo-capacitor and an electric double layer capacitor.

9. A device according to Embodiment 7 or 8, wherein the gel electrolyte further comprises a lithium salt and a plasticizer having an acidamide.

10. A device according to anyone of the above-mentioned Embodiment, wherein the lithium salt is a lithium perchlorate, and the plasticizer having the acidamide is a dimethylformamide (DMF).

11. A device according to anyone of the above-mentioned Embodiments further comprising an electrode, wherein the electrode is an activated carbon.

12. A device according to anyone of the above-mentioned Embodiments, wherein the activated carbon is one selected from a group consisting of an active carbon fiber, a porous carbon material, a high electrical conductivity carbon material, and a combination thereof.

13. A manufacturing method for a charge storage device, comprising the steps of:
providing a gel electrolyte layer, a first electrode material layer and a second electrode material layer;
wetting the first and the second electrode material layers with one of an organic solvent and an electrolyte; and pressing the wetted first electrode material layer, the gel electrolyte layer, and the wetted second electrode material layer to manufacture the charge storage device, wherein the gel electrolyte layer is configured between the wetted first electrode material layer and the wetted second electrode material layer.

14. A manufacturing method according to Embodiment 13, wherein the gel electrolyte layer comprises a gel electrolyte being one selected from a group consisting of a P(AN-EG-AN) copolymer, a P(AN-EG) copolymer, a P(EG-AN-EG) copolymer and a combination thereof.

15. A manufacturing method according to Embodiment 13 or 14, wherein the pressing step further comprises a step of causing the gel electrolyte to be embedded into the wetted first electrode material layer and the wetted second electrode material layer and to be tightly connected with the wetted first electrode material layer and the wetted second electrode material layer 16. A manufacturing method according to anyone of the above-mentioned Embodiments, wherein the pressing step is to press a first current collector layer, the wetted first electrode material layer, the gel electrolyte layer, the wetted second electrode material layer, and a second current collector layer, and the charge storage device includes a first current collector, a first electrode, the gel electrolyte, a second electrode and a second current collector.

17. A manufacturing method according to anyone of the above-mentioned Embodiments, wherein the charge storage device is a super capacitor being one of a pseudo-capacitor and an electric double layer capacitor, the gel electrolyte further comprises a lithium salt and a plasticizer having an acidamide, and the first and the second electrode material layers are respectively a first and a second carbon layers.

18. A manufacturing method according to anyone of the above-mentioned Embodiments, wherein the lithium salt is a lithium perchlorate, and the plasticizer having the acidamide is a dimethylformamide (DMF).

19. A manufacturing method according to anyone of the above-mentioned Embodiments, wherein the first and the second electrodes are respectively formed by the first and the second carbon layers 20. A manufacturing method according to anyone of the above-mentioned Embodiments, wherein the pressing step is accomplished by one of a roll-to-roll process and a stack production process.

According to the aforementioned descriptions, the present invention provides a super capacitor including a gel electrolyte and manufacturing method thereof. The gel electrolyte having a high conductivity copolymer of P(AN-EG-AN) includes the characteristics of having higher conductivity (e.g., $>10^{-2}$ S cm$^{-1}$), lower impedance, higher energy density, higher power density and wider working potential window, this gel copolymer is manufactured into a thin-film electrolyte applicable to a super capacitor so as to possess the non-obviousness and the novelty.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A super capacitor comprising a gel electrolyte comprising a copolymer being one selected from a group consisting of a P(AN-EG-AN) copolymer, a P(AN-EG) copolymer, a P(EG-AN-EG) copolymer and a combination thereof.

2. A super capacitor according to claim 1 being one of a pseudo-capacitor and an electric double layer capacitor.

3. A super capacitor according to claim 1, wherein the gel electrolyte further comprises a lithium salt and a plasticizer having an acidamide.

4. A super capacitor according to claim 3, wherein the lithium salt is a lithium perchlorate, and the plasticizer having the acidamide is a dimethylformamide (DMF).

5. A super capacitor according to claim 1 further comprising an electrode, wherein the electrode is an activated carbon.

6. A super capacitor according to claim 5, wherein the activated carbon is one selected from a group consisting of an active carbon fiber, a porous carbon material, a high electrical conductivity carbon material, and a combination thereof.

7. A charge storage device, comprising a gel electrolyte comprising a copolymer being one selected from a group consisting of a P(AN-EG-AN) copolymer, a P(AN-EG) copolymer, a P(EG-AN-EG) copolymer and a combination thereof.

8. A device according to claim 7 being a super capacitor, wherein the super capacitor is one of a pseudo-capacitor and an electric double layer capacitor.

9. A device according to claim 7, wherein the gel electrolyte further comprises a lithium salt and a plasticizer having an acidamide.

10. A device according to claim 9, wherein the lithium salt is a lithium perchlorate, and the plasticizer having the acidamide is a dimethylformamide (DMF).

11. A device according to claim 7 further comprising an electrode, wherein the electrode is an activated carbon.

12. A device according to claim 11, wherein the activated carbon is one selected from a group consisting of an active carbon fiber, a porous carbon material, a high electrical conductivity carbon material, and a combination thereof.

* * * * *